United States Patent
Seki et al.

(10) Patent No.: US 11,365,683 B2
(45) Date of Patent: Jun. 21, 2022

(54) FUEL SUPPLY CONTROL DEVICE

(71) Applicant: IHI CORPORATION, Tokyo (JP)

(72) Inventors: Naoki Seki, Tokyo (JP); Yasuhiko Yamamoto, Tokyo (JP); Akihiro Shimamura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 70 days.

(21) Appl. No.: 17/010,490

(22) Filed: Sep. 2, 2020

(65) Prior Publication Data
US 2020/0400074 A1  Dec. 24, 2020

Related U.S. Application Data

(63) Continuation of application No. PCT/JP2019/009076, filed on Mar. 7, 2019.

(30) Foreign Application Priority Data

Mar. 8, 2018 (JP) .............................. JP2018-042111

(51) Int. Cl.
 *F02C 7/232* (2006.01)
 *F02C 9/30* (2006.01)
 *F02C 7/236* (2006.01)

(52) U.S. Cl.
 CPC ................ *F02C 7/232* (2013.01); *F02C 9/30* (2013.01); *F02C 7/236* (2013.01);
 (Continued)

(58) Field of Classification Search
 CPC .. F02C 7/22; F02C 7/232; F02C 7/236; F02C 9/30; F02C 9/28; F02C 9/26; F02M 37/08;
 (Continued)

(56) References Cited

U.S. PATENT DOCUMENTS 4,248,194 A * 2/1981 Drutchas ................. F02D 41/40
　　　　　　　　　　　　　　　　　　　　123/357
5,020,315 A * 6/1991 Leachman, Jr. ........ F02C 9/263
　　　　　　　　　　　　　　　　　　　　60/39.281
(Continued)

FOREIGN PATENT DOCUMENTS

EP　　　　3040277 A1　　7/2016
JP　　　2012117391 A　　6/2012
(Continued)

OTHER PUBLICATIONS

International Search Report issued in Application No. PCT/JP2019/009076, dated Jun. 4, 2019, 29 pages.
(Continued)

*Primary Examiner* — Alain Chau
(74) *Attorney, Agent, or Firm* — Rothwell, Figg, Ernst & Manbeck, P.C.

(57) ABSTRACT

A fuel supply control device is provided in which a parallel flow path of an orifice and a pressurizing valve is used as a complex pressurizing valve for a fuel supply amount, and which controls a fuel supply pump on the basis of a pressure difference before and after the complex pressurizing valve that has been detected by a pressure difference meter. When the rotational speed of the fuel supply pump is below a predetermined threshold value, the fuel supply pump is controlled on the basis of a first fuel measurement amount, and the fuel supply pump is controlled on the basis of a second fuel measurement amount.

4 Claims, 5 Drawing Sheets

(52) U.S. Cl.
CPC ............... *F05D 2220/323* (2013.01); *F05D 2270/3015* (2013.01); *F05D 2270/52* (2013.01)

(58) Field of Classification Search
CPC ........ F02M 2037/087; F02D 2041/225; F02D 2041/226
See application file for complete search history.

(56) References Cited

U.S. PATENT DOCUMENTS

| | | | | |
|---|---|---|---|---|
| 5,685,268 | A * | 11/1997 | Wakemen | F02D 41/3809 123/198 D |
| 6,182,438 | B1 * | 2/2001 | Weber | F02C 9/28 60/778 |
| 7,481,102 | B2 | 1/2009 | Bickley | |
| 10,260,425 | B2 * | 4/2019 | Crowley | F02C 7/232 |
| 2001/0052338 | A1 * | 12/2001 | Yates | F02D 33/006 123/506 |
| 2004/0177602 | A1 | 9/2004 | Griffiths et al. | |
| 2005/0217236 | A1 * | 10/2005 | Wernberg | F02C 9/30 60/39.281 |
| 2010/0115959 | A1 * | 5/2010 | Anson | F02C 9/30 60/734 |
| 2015/0192073 | A1 | 7/2015 | Griffiths et al. | |
| 2017/0321608 | A1 * | 11/2017 | Crowley | F02C 9/00 |
| 2019/0048898 | A1 * | 2/2019 | Harada | F16H 61/0031 |
| 2020/0340408 | A1 * | 10/2020 | Yamamoto | F02C 9/28 |

FOREIGN PATENT DOCUMENTS

| | | |
|---|---|---|
| JP | 2013231406 A | 11/2013 |
| JP | 201547902 A | 3/2015 |

OTHER PUBLICATIONS

Seki, N. et al., "Development of Fuel Control System for more Electric Engine," Proceedings of ASME Turbo Expo 2015: Turbine Technical Conference and Exposition, Jun. 2015, vol. 6, No. GT2015-43213, pp. V006T05A020-10 to V006T05A020-1 , ISBN: 978-0-7918-5675-8.

* cited by examiner

FUEL SUPPLY CONTROL DEVICE

CROSS REFERENCE TO RELATED APPLICATIONS

The present application is a continuation application of International Application No. PCT/JP2019/009076, filed Mar. 7, 2019, which claims priority to Japanese Patent Application No. 2018-042111, filed Mar. 8, 2018. The contents of these applications are incorporated herein by reference in their entirety.

TECHNICAL FIELD

The present disclosure relates to a fuel supply control device.

An internal leak amount of a fuel pump (a gear pump) increases as the gear pump deteriorates with time. Therefore, even when the gear pump is driven at the same rotational speed before and after deterioration over time, a discharge flow rate of fuel after deterioration over time is lower than that of fuel before deterioration over time. Patent Document 1 below discloses a fuel supply system in which a valve (a pressurizing valve) is provided on the downstream side of the gear pump, and by measuring a discharge flow rate of a gear pump with the pressurizing valve, a rotational speed of the gear pump is corrected in response to secular change in the gear pump to realize highly accurate fuel supply. Further, a fuel supply system is also disclosed in Patent Document 2 and Non-Patent Document 1 below.

DOCUMENTS OF THE RELATED ART

Patent Document

[Patent Document 1]
Japanese Unexamined Patent Application. First Publication No. 2012-117391
[Patent Document 2]
U.S. Pat. No. 7,481,102

Non-Patent Document

[Non-Patent Document 1]
Seki, Naoki, Noriko Morioka, Oyori Hitoshi and Yasuhiko Yamamoto (2015) "DEVELOPMENT OF FUEL CONTROL SYSTEM FOR MORE ELECTRIC ENGINE," GT2015-43213, Proceedings of ASME Turbo Expo 2015: Turbine Technical Conference and Exposition GT2015 Jun. 15-19, 2015, Montreal, Canada

SUMMARY

However, in the above-described conventional fuel supply system, since the behavior of the pressurizing valve has hysteresis, reproducibility regarding the measurement of the discharge flow rate of the fuel pump is poor. Therefore, in the conventional fuel supply system, the accuracy of fuel supply is not always sufficient.

The present disclosure has been made in view of the above circumstances, and an object thereof is to improve accuracy in fuel supply as compared with the related art.

In order to achieve the aforementioned object, in a first aspect according to a fuel supply control device, the present disclosure employs a fuel supply control device in which a parallel flow path of an orifice and a pressurizing valve is used as a complex pressurizing valve for a fuel supply amount and a fuel supply pump is controlled on the basis of a differential pressure before and after the complex pressurizing valve detected by a differential pressure meter, wherein the fuel supply pump is configured to be controlled on the basis of a first fuel measurement amount obtained from the differential pressure before and after the complex pressurizing valve and a mutual relationship between the differential pressure before and after the complex pressurizing valve and a fuel flow rate when a rotational speed of the fuel supply pump is below a predetermined threshold value, and the fuel supply pump is controlled on the basis of a second fuel measurement amount obtained from a pump volume efficiency in consideration of an internal leak area of the fuel supply pump and a theoretical pump discharge volume when the rotational speed exceeds the predetermined threshold value.

In the present disclosure, as a second aspect of the fuel supply control device, in the first aspect, the fuel supply control device may include a flow rate calculation unit which calculates the first fuel measurement amount and the second fuel measurement amount; a switching logic circuit which generates a switching signal by comparing the rotational speed of the fuel supply pump with the predetermined threshold value; a flow rate selection switch which selectively selects the first fuel measurement amount or the second fuel measurement amount on the basis of the switching signal; a subtractor which calculates a deviation between an output of the flow rate selection switch and a control target value; and a control calculation unit which generates an operation amount of the fuel supply pump by performing a predetermined control calculation process on the deviation.

In the present disclosure, as a third aspect of the fuel supply control device, in the first or second aspect, the fuel supply control device may be configured to acquire the internal leak area when the rotational speed of the fuel supply pump is below the predetermined threshold value.

In the present disclosure, as a fourth aspect of the fuel supply control device, in any one of the first to third aspects, the internal leak area may be obtained from the first fuel measurement amount, the rotational speed, the theoretical pump discharge volume, a fuel temperature at an inflow port of the fuel supply pump, a differential pressure before and after the fuel supply pump, and a flow rate coefficient of the fuel supply pump.

In the present disclosure, as a fifth aspect of the fuel supply control device, in any one of the first to fourth aspects, the pump volume efficiency may be obtained from the internal leak area, the rotational speed, the fuel temperature at the inflow port of the fuel supply pump, the differential pressure before and after the fuel supply pump, and the flow rate coefficient of the fuel supply pump.

According to the present disclosure, it is possible to improve measurement reproducibility of fuel discharged from a fuel pump, as compared with the related art.

DETAILED DESCRIPTION

Hereinafter, an embodiment of the present disclosure will be described with reference to the drawings. First, a fuel supply device F in the embodiment will be described with reference to FIG. 1. The fuel supply device F is a device which supplies a predetermined fuel to a gas turbine G. and more specifically, a device which supplies a predetermined amount of fuel to a plurality of fuel nozzles Z provided in a combustor of the gas turbine G.

The gas turbine G is an internal combustion engine provided in an aircraft as a thrust source for flight and is a jet engine which obtains a thrust by injecting combustion exhaust gas obtained from the combustor to the rear. That is, the fuel supply device F in the embodiment is a device provided in an aircraft.

Figure 1:
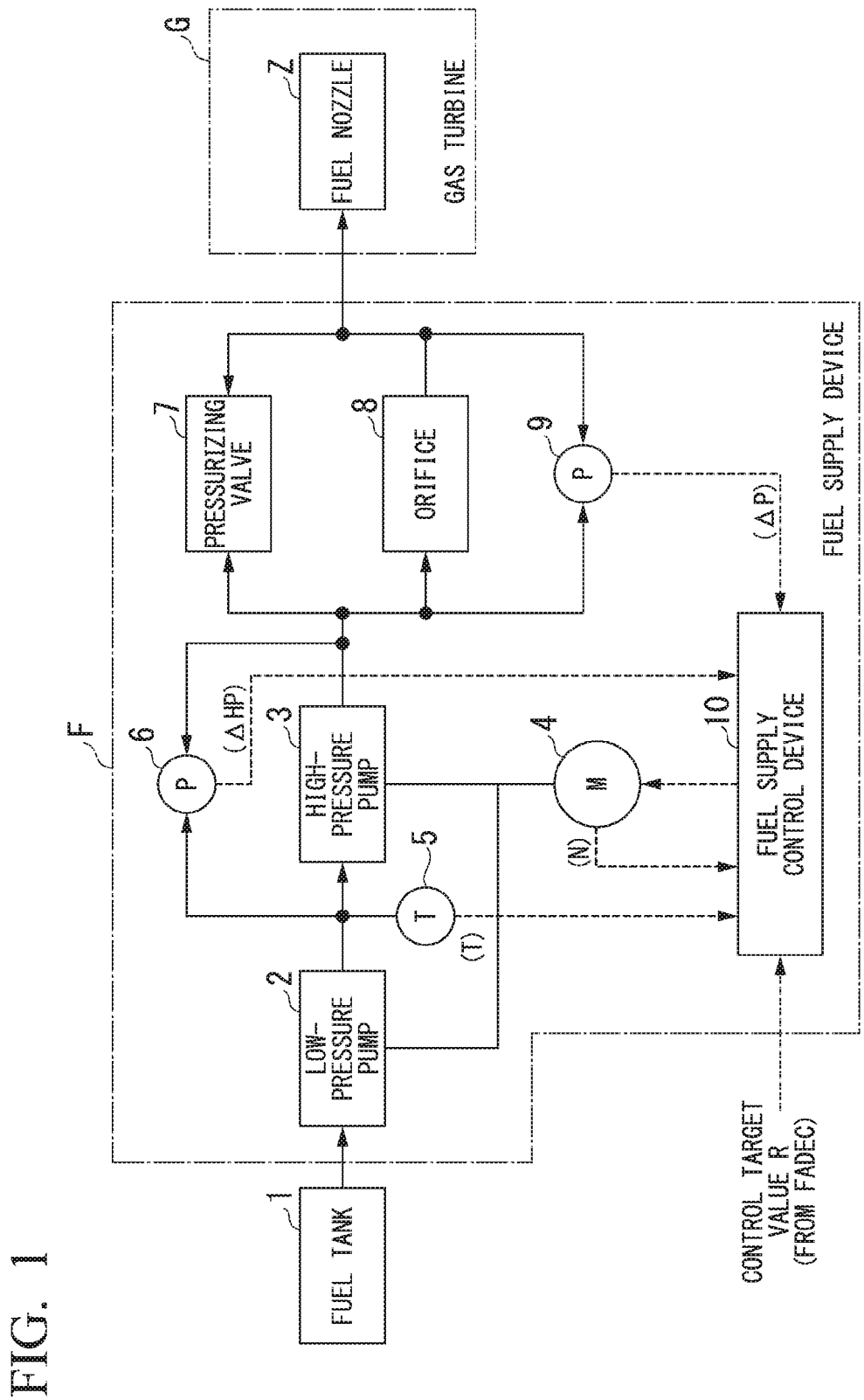
FIG. 1 is a block diagram showing a system constitution of a fuel supply device according to the present disclosure.

As shown in FIG. 1, such a fuel supply device F is a device which supplies a fuel supplied from a fuel tank 1 to the gas turbine G and includes a low-pressure pump 2, a high-pressure pump 3, an electric motor 4, a thermometer 5, a pump differential pressure meter 6, a pressurizing valve 7, an orifice 8, a valve differential pressure meter 9, and a fuel supply control device 10.

The fuel tank 1 is a container which stores a predetermined amount of fuel, and supplies the low-pressure pump 2 with fuel. The low-pressure pump 2 is a centrifugal pump (a non-volumetric pump) which pumps fuel from the fuel tank 1 to increase a pressure of the fuel to a predetermined pressure, generates a low-pressure fuel and then discharges the low-pressure fuel toward the high-pressure pump 3. The fuel tank 1 may include an airframe fuel pump (a centrifugal pump). In such a case, the fuel is supplied from the airframe fuel pump to the low-pressure pump 2.

The high-pressure pump 3 is a gear pump (a volumetric pump) which increases a pressure of the low-pressure fuel supplied from the low-pressure pump 2 to a predetermined pressure, generates a high-pressure fuel and then discharges the high-pressure fuel to each of the plurality of fuel nozzles Z. The high-pressure pump 3 finally sets a supply amount of the fuel (a fuel supply amount) supplied from the fuel supply device F to the gas turbine G (the fuel nozzle Z), and is a fuel supply pump in the embodiment.

The electric motor 4 is a power source which rotationally drives the low-pressure pump 2 and the high-pressure pump 3. An output shaft (a drive shaft) of the electric motor 4 is axially coupled to a rotary shaft (a driven shaft) of the low-pressure pump 2 and a rotary shaft (a driven shaft) of the high-pressure pump 3 via a predetermined coupling mechanism (not shown). That is, a certain correlation is established between the rotational speed of the electric motor 4 (a motor rotational speed) and the rotational speed of the low-pressure pump 2 and the rotational speed of the high-pressure pump 3.

Further, the electric motor 4 also outputs the motor rotational speed, which is the rotational speed of the electric motor 4, to the fuel supply control device 8. In the embodiment, for convenience, the motor rotational speed is treated as a rotational speed N of the fuel supply pump. Also, instead of the low-pressure pump 2 and the high-pressure pump 3 being axially coupled to each other, the low-pressure pump 2 and the high-pressure pump 3 may be individually rotationally driven by electric motors individually provided for the low-pressure pump 2 and the high-pressure pump 3. That is, two electric motors may be provided.

The thermometer 5 is a temperature detector which detects a temperature of the low-pressure fuel flowing into the high-pressure pump 3 as a fuel temperature T. The thermometer 5 outputs the fuel temperature T to the fuel supply control device 10. The pump differential pressure meter 6 is a differential pressure transmitter which measures a differential pressure between an inlet (the upstream side, the inlet side) and an outlet (the downstream side, the outlet side) of the high-pressure pump 3, that is, a differential pressure between an inflow pressure of the low-pressure fuel and a discharge pressure of the high-pressure fuel as a differential pressure ΔHP before and after the high-pressure pump. The pump differential pressure meter 6 outputs the differential pressure ΔHP before and after the high-pressure pump to the fuel supply control device 10.

The pressurizing valve 7 is provided at an intermediate portion of a fuel pipe which connects a discharge port of the high-pressure pump 3 to an inflow port of the fuel nozzle Z. The pressurizing valve 7 is closed when a discharge amount of the high-pressure pump 3 is relatively low, and is opened when the discharge amount of the high-pressure pump 3 exceeds a predetermined value. Like the pressurizing valve 7, the orifice 8 is provided at an intermediate portion of the fuel pipe which connects the discharge port of the high-pressure pump 3 to the inflow port of the fuel nozzle Z.

The pressurizing valve 7 and the orifice 8 form a parallel flow path via the fuel pipe, as shown in the drawing. That is, both an inflow port of the pressurizing valve 7 and an inflow port of the orifice 8 are connected to a discharge port of the high-pressure pump 3 via a fuel pipe, and both an outlet port of the pressurizing valve 7 and an outlet port of the orifice 8 are connected to the inflow port of the fuel nozzle Z via a fuel pipe. The pressurizing valve 7 and the orifice 8 constitute a complex pressurizing valve which detects a flow rate (a fuel supply amount) of the high-pressure fuel supplied from the high-pressure pump 3 to the fuel nozzle Z.

The valve differential pressure meter 9 is a differential pressure transmitter which detects a differential pressure between the upstream side (the inflow port side) and the downstream side (the outlet port side) of the pressurizing valve 7 and the orifice 8 as a differential pressure ΔP before and after the valve. This differential pressure ΔP before and after the valve is a fuel flow rate, that is, a physical amount which corresponds to a pressure amount which changes according to the motor rotational speed, that is, the fuel flow rate. The valve differential pressure meter 9 outputs the differential pressure ΔP before and after the valve to the fuel supply control device 10.

The fuel supply control device 10 controls the flow rate of the high-pressure fuel supplied from the fuel supply device F to the gas turbine G (the fuel nozzle Z) by controlling the electric motor 4 on the basis of the above-described fuel temperature T, rotational speed N, differential pressure ΔHP before and after the high-pressure pump, differential pressure ΔP before and after the valve, and a control target value R input from a host control system. The fuel supply control device 10 is a software control device which generates an operation amount of the electric motor 4 by executing a predetermined control program with predetermined hardware. The predetermined hardware includes a storage device (a random-access memory, a read-only memory, a hard disk drive, or the like) which stores the control program or the like, a central processing unit (CPU) which directly executes the control program, an interface circuit which is interposed between the CPU and the electric motor 4 and between the CPU and various detectors (the thermometer 5, the pump differential pressure meter 6 and the valve differential pressure meter 9) and transmits and receives various signals, and the like.

Figure 2:
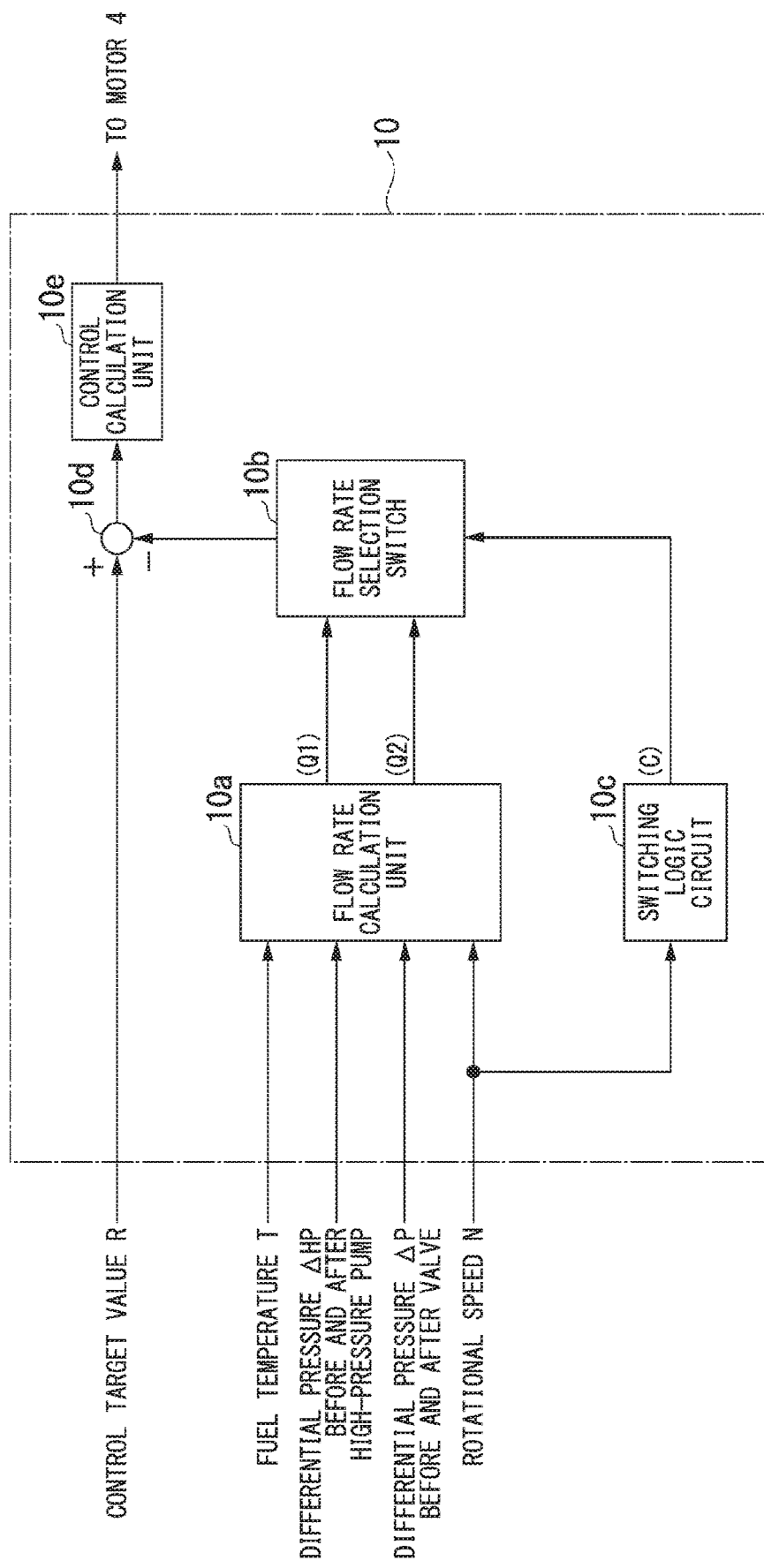
FIG. 2 is a block diagram showing a functional constitution of a fuel supply control device according to an embodiment of the present disclosure.

Such a fuel supply control device 10 includes a flow rate calculation unit 10a, a flow rate selection switch 10b, a switching logic circuit 10c, a subtractor 10d, and a control calculation unit 10e shown in FIG. 2, as functional components realized by cooperation of the control program (the software) and the hardware.

The flow rate calculation unit 10a calculates a flow rate (a first fuel measurement amount Q1) of the high-pressure fuel when the gas turbine G is started and a flow rate (a second fuel measurement amount Q2) of the high-pressure fuel when the gas turbine G is not started on the basis of the above-described fuel temperature T, rotational speed N, differential pressure ΔHP before and after the high-pressure pump, and differential pressure ΔP before and after the valve. That is, the flow rate calculation unit 10a is a calculation device which estimates and calculates the first fuel measurement amount Q1 and the second fuel measurement amount Q2 by performing information processing on four measured amounts (the fuel temperature T, the rotational speed N, the differential pressure ΔHP before and after the high-pressure pump, and the differential pressure ΔP before and after the valve) on the basis of a predetermined flow rate measurement program stored in advance. The flow rate calculation unit 10a outputs the first fuel measurement amount Q1 and the second fuel measurement amount Q2 to the flow rate selection switch 10b.

The flow rate selection switch 10b selectively selects any one of the first fuel measurement amount Q1 and the second fuel measurement amount Q2 on the basis of a switching signal C input from the switching logic circuit 10c. The flow rate selection switch 10b outputs the fuel flow rate (the first fuel measurement amount Q1 or the second fuel measurement amount Q2) selected by itself to the subtractor 10d. In order to curb a rapid flow rate change which occurs at the time of switching between the first fuel measurement amount Q1 and the second fuel measurement amount Q2, the two amounts may be switched therebetween via an average value of the first fuel measurement amount Q1 and the second fuel measurement amount Q2, or the two amounts may be switched to obtain a smooth flow rate change by performing a slope interpolation between the first fuel measurement amount Q1 and the second fuel measurement amount Q2.

The switching logic circuit 10c is a logic circuit which generates the switching signal C on the basis of the above-described rotational speed N. That is, the switching logic circuit 10c generates the switching signal C which causes the flow rate selection switch 10b to select the first fuel measurement amount Q1 when the rotational speed N is equal to or lower than a predetermined switching threshold value, and generates the switching signal C which causes the flow rate selection switch 10b to select the second fuel measurement amount Q2 instead of the first fuel measurement amount Q1 when the rotational speed N exceeds the predetermined switching threshold value.

The subtractor 10d calculates a deviation (a fuel flow rate deviation) in the output of the flow rate selection switch 10b with respect to the control target value R (the control target value of the fuel flow rate) input from a full authority digital engine control (FADEC) and then outputs the fuel flow rate deviation to the control calculation unit 10e.

The control calculation unit 10e generates an operation amount of the electric motor 4 by performing a predetermined control calculation process (a PID calculation process) on the fuel flow rate deviation input from the subtractor 10d. Here, since the high-pressure pump 3 is rotationally driven by the electric motor 4, the operation amount generated by the control calculation unit 10e is an operation amount of the electric motor 4 as well as an operation amount of the high-pressure pump 3.

Here, a detailed constitution of the above-described flow rate calculation unit 10a will be described with reference to FIG. 3. The flow rate calculation unit 10a includes a differential pressure/flow rate conversion table 10f, a fuel density calculation unit 10g, a leak area calculation unit 10h, a volume efficiency calculation unit 10i, and a multiplier 10j, as shown in the drawing.

The differential pressure/flow rate conversion table 10f is a control table which indicates a mutual relationship between the differential pressure ΔP before and after the valve and the fuel flow rate Q. The differential pressure/flow rate conversion table 10f is acquired in advance as a characteristic of the complex pressurizing valve and stored in an internal storage device of the fuel supply control device 8. Such a differential pressure/flow rate conversion table 10f outputs the fuel flow rate Q corresponding to the differential pressure ΔP before and after the valve input from the valve differential pressure meter 9 to the leak area calculation unit 10h and also outputs the fuel flow rate Q to the flow rate selection switch 10b as the first fuel measurement amount Q1.

The fuel density calculation unit 10g acquires a density of the fuel (a fuel density ρ) on the basis of the fuel temperature T input from the thermometer 5. That is, the fuel density calculation unit 10g calculates the fuel density ρ on the basis of a calculation formula obtained in advance for fuel, that is, a relational expression between the fuel density ρ and the fuel temperature T. Then, the fuel density calculation unit 10g outputs the fuel density ρ to the leak area calculation unit 10h and the volume efficiency calculation unit 10i.

The leak area calculation unit 10h acquires an internal leak area $A_{leak}$ of the high-pressure pump 3 on the basis of the above-described fuel flow rate Q (the first fuel measurement amount Q), fuel density ρ, rotational speed N of the high-pressure pump 3, theoretical pump discharge volume Vth, differential pressure ΔHP before and after the high-pressure pump, and flow rate coefficient Cd. That is, the leak area calculation unit 10h calculates the internal leak area $A_{leak}$ by substituting the above-described fuel flow rate Q (the first fuel measurement amount Q1), fuel density ρ, rotational speed N, theoretical pump discharge volume Vth, differential pressure ΔHP before and after the high-pressure pump, and flow rate coefficient Cd into the following Formula (1) stored in advance in the internal storage device. Then, the leak area calculation unit 10h outputs this internal leak area $A_{leak}$ to the volume efficiency calculation unit 10i.

[Formula 1]

$$A leak = \frac{Vth \cdot N - Q}{Cd} \sqrt{\frac{\rho}{2\Delta HP}} \quad (1)$$

The volume efficiency calculation unit 10i acquires a volume efficiency iv (pump volume efficiency) of the high-pressure pump 3 on the basis of the internal leak area $A_{leak}$ calculated in this way, and the above-described fuel density ρ, rotational speed N, theoretical pump discharge volume Vth, differential pressure ΔHP before and after the high-pressure pump, and flow rate coefficient Cd. That is, the volume efficiency calculation unit 10i calculates the volume efficiency ηv by substituting the above-described internal leak area $A_{leak}$, fuel density ρ, rotational speed N, differential pressure ΔHP before and after the high-pressure pump, and flow rate coefficient Cd into the following Formula (2) stored in advance in the internal storage device. Then, the volume efficiency calculation unit 10i outputs the volume efficiency ηv to the multiplier 10j.

[Formula 2]

$$\eta v = 1 - \frac{Cd \cdot Aleak}{Vth \cdot N} \sqrt{\frac{2\Delta HP}{\rho}} \quad (2)$$

The multiplier 10j obtains the second fuel measurement amount Q2 by multiplying the volume efficiency ηv calculated in this way by the above-described theoretical pump discharge volume Vth and rotational speed N. Then, the multiplier 10j outputs the second fuel measurement amount Q2 to the flow rate selection switch 10b.

Next, an operation of the fuel supply control device 10 according to the embodiment will be described in detail. The fuel supply control device 10 feedback-controls the high-pressure pump 3 by generating an operation amount such that the fuel supply amount becomes equal to the control target value R and outputting the operation amount to the high-pressure pump 3 (the fuel supply pump) as a basic operation. That is, the fuel supply control device 10 causes the control calculation unit 10e to generate an operation amount such that the fuel deviation calculated by the subtractor 10d becomes "zero".

Here, in the fuel supply control device 10, the first fuel measurement amount Q1 or the second fuel measurement amount Q2 selected by the selection switch 10b is input to the subtractor 10d as a control amount. Further, the selection of the control amount by the selection switch 10b is performed on the basis of the switching signal C. Then, the switching signal C causes the selection switch 8f to select the first fuel measurement amount Q1 when the rotational speed N of the high-pressure pump 3 is below a predetermined switching threshold value and causes the selection switch 8f to select the second fuel measurement amount Q2 instead of the first fuel measurement amount Q1 when the rotational speed N of the high-pressure pump 3 exceeds the predetermined switching threshold value.

That is, when the rotational speed N of the high-pressure pump 3 is below the predetermined switching threshold value, for example, in a low flow rate region (a low flow rate state) in which the fuel supply amount is relatively small, such as a state in which the pressurizing valve 5 is closed, the rotation of the high-pressure pump 3 is feedback-controlled on the basis of the first fuel measurement amount Q1 (the control amount) generated by the differential pressure ΔP before and after the valve detected by the valve differential pressure meter 9 and the differential pressure/flow rate conversion table 10f. That is, for example, in the low flow rate region such as the state of the fuel supply amount at the time of starting the gas turbine G, the high-pressure pump 3 is feedback-controlled using the first fuel measurement amount Q1 as the control amount.

On the other hand, when the rotational speed N of the high-pressure pump 3 exceeds the predetermined switching threshold value, for example, in a high flow rate region (a high flow rate state) in which the fuel supply amount is relatively large, such as a state in which the pressurizing valve 5 is opened from a state immediately before the valve is opened, the rotation of the high-pressure pump 3 is feedback-controlled on the basis of the second fuel measurement amount Q2 (the control amount) generated in consideration of the internal leak area $A_{leak}$ of the high-pressure pump 3. That is, for example, in the high flow rate range such as the state of the fuel supply amount when the gas turbine G is not started, the high-pressure pump 3 is feedback-controlled using the second fuel measurement amount Q2 as the control amount.

Here, the internal leak area $A_{leak}$ is acquired in a state in which the rotational speed N of the high-pressure pump 3 is below the predetermined switching threshold value. That is, the leak area calculation unit 10h calculates the internal leak area Aica in a state in which the internal leak amount of the high-pressure pump 3 accounts for a large proportion of a discharge amount of the high-pressure pump 3, that is, at a timing of the low flow rate region. Therefore, the internal leak area $A_{leak}$ is calculated with higher accuracy than the internal leak area Ai acquired at a timing of the high flow rate region.

According to the embodiment, in the low flow rate region such as a state in which the pressurizing valve 5 is closed, the high-pressure pump 3 is feedback-controlled with the first fuel measurement amount Q1 as the control amount, and in the high flow rate range such as a state in which the pressurizing valve 5 is opened after the valve is opened, the high-pressure pump 3 is feedback-controlled with the second fuel measurement amount Q2 generated in consideration of the internal leak area $A_{leak}$ of the high-pressure pump 3 as the control amount. Thus, it is possible to reduce an influence of hysteresis of the pressurizing valve 5. Therefore, according to the embodiment, it is possible to improve the accuracy of fuel supply from the fuel supply device F to the gas turbine G, as compared with the related art.

Further, according to the embodiment, the second fuel measurement amount Q2 is generated in consideration of the internal leak area $A_{leak}$ acquired in the state in which the rotational speed N of the high-pressure pump 3 is below the predetermined switching threshold value. Thus, the accuracy of fuel supply in the high flow rate range can also be further improved.

Further, according to the embodiment, the internal leak area $A_{leak}$ is acquired on the basis of the fuel flow rate Q (the first fuel measurement amount Q1), the fuel density ρ, the rotational speed N, the theoretical pump discharge volume Vth, the differential pressure ΔHP before and after the high-pressure pump, and the flow rate coefficient Cd. Accordingly, the highly accurate internal leak area $A_{leak}$ can be acquired. Thus, according to the present embodiment, the accuracy of fuel supply in the high flow rate region can also be further improved.

Further, according to the embodiment, the volume efficiency ηv of the high-pressure pump 3 is acquired on the basis of the internal leak area $A_{leak}$, the fuel density ρ, the rotational speed N, the differential pressure ΔHP before and after the high-pressure pump, and the flow rate coefficient Cd. Thus, it is possible to obtain a highly accurate volume efficiency ηv. Therefore, according to the embodiment, the accuracy of fuel supply in the high flow rate range can also be further improved.

The present disclosure is not limited to the above-described embodiment, and for example, the following modified examples are possible.

Figure 3:
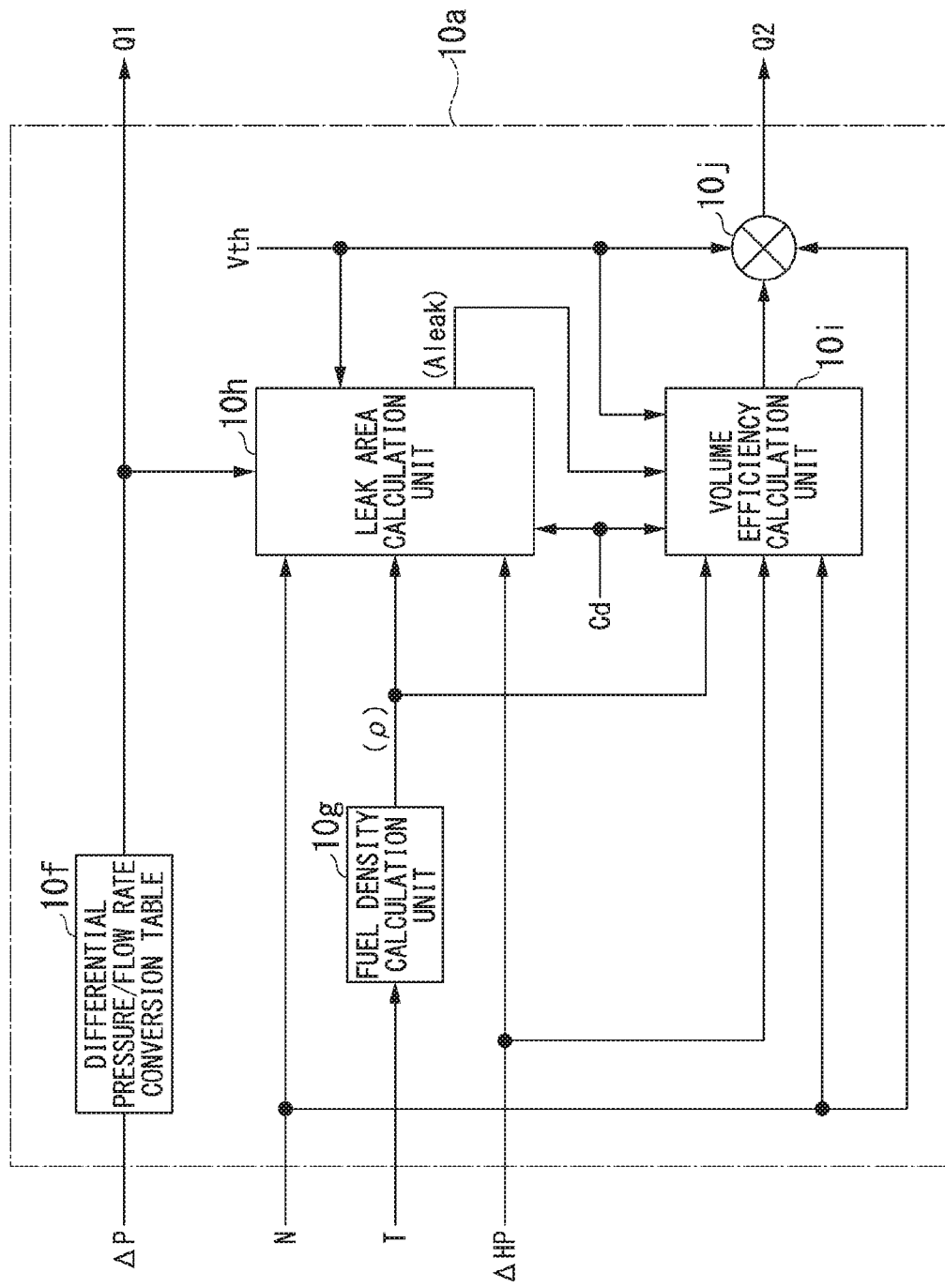
FIG. 3 is a block diagram showing a functional constitution of a flow rate calculation unit according to an embodiment of the present disclosure.
Figure 4:
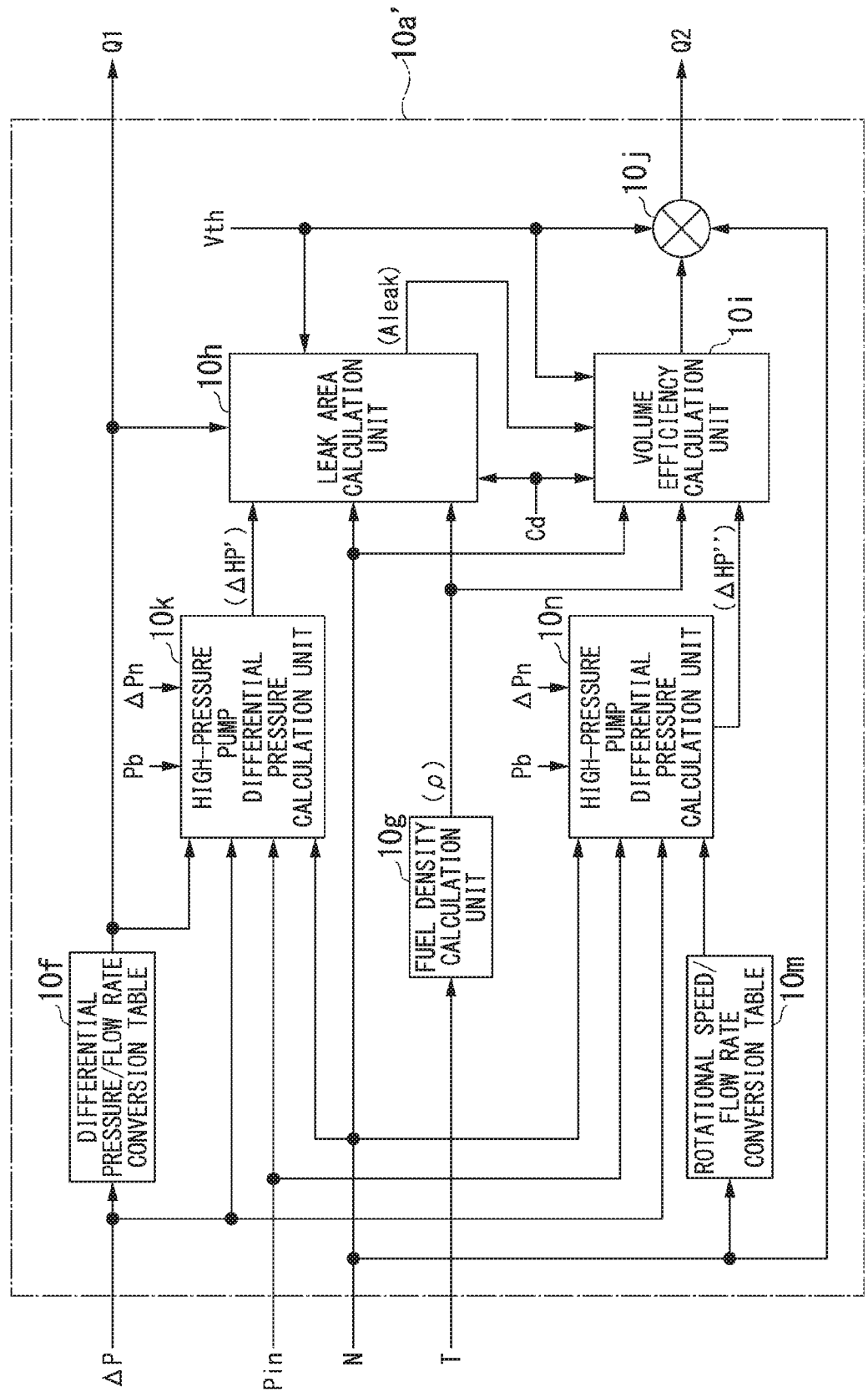
FIG. 4 is a block diagram showing a functional constitution of a flow rate calculation unit in a modified example of the embodiment of the present disclosure.

(1) In the above-described embodiment, although the flow rate calculation unit 10a is constituted as shown in FIG. 3, the constitution of FIG. 3 is merely an example, and the present disclosure is not limited thereto. For example, a flow rate calculation unit 10a' shown in FIG. 4 may be adopted instead of the flow rate calculation unit 10a.

That is, the flow rate calculation unit 10a' includes a first high-pressure pump differential pressure calculation unit 10k, a rotational speed/flow rate conversion table 10m, and a second high-pressure pump differential pressure calculation unit 10n in addition to the above-described differential pressure/flow rate conversion table 10f, fuel density calculation unit 10g, leak area calculation unit 10h, volume efficiency calculation unit 10i, and multiplier 10j.

The first high-pressure pump differential pressure calculation unit 10k calculates a differential pressure $\Delta HP'$ before and after the high-pressure pump on the basis of the fuel flow rate Q input from the differential pressure/flow rate conversion table 10f, and the differential pressure $\Delta P$ before and after the valve, a low-pressure pump inlet pressure Pin, a rotational speed N, a combustor pressure Pb, and a combustion nozzle differential pressure $\Delta Pn$ which are input separately. That is, the first high-pressure pump differential pressure calculation unit 10k calculates a boost amount (a low-pressure pump boosting S) of the low-pressure pump 2 on the basis of the fuel flow rate Q and the rotational speed N and calculates the differential pressure $\Delta HP'$ before and after the high-pressure pump on the basis of the following Formula (3) based on the low-pressure pump boosting S, the differential pressure $\Delta P$ before and after the valve, the low-pressure pump inlet pressure Pin, the combustor pressure Pb. and the combustion nozzle differential pressure $\Delta Pn$.

$$\Delta HP' = \{Pb - \Delta Pn - \Delta P - (Pin + S)\} \quad (3)$$

The combustor pressure Pb is obtained from FADEC (a control device provided outside the fuel supply control device), and the low-pressure pump inlet pressure Pin is obtained from a pressure meter separately provided to the fuel supply device. Further, regarding the combustion nozzle differential pressure $\Delta Pn$, a control table which indicates a relationship with the fuel flow rate Q is created on the basis of a test result in advance and then stored in the fuel supply control device in advance. Such a first high-pressure pump differential pressure calculation unit 10k outputs the differential pressure $\Delta HP'$ before and after the high-pressure pump to the leak area calculation unit 10h.

The rotational speed/flow rate conversion table 10m is a control table which indicates a mutual relationship between the rotational speed N of the high-pressure pump 3 and the fuel flow rate Q. The rotational speed/flow rate conversion table 10m is acquired in advance as a characteristic of the high-pressure pump 3 and is stored in the internal storage device. Such a rotational speed/flow rate conversion table 10m outputs the fuel flow rate Q corresponding to the rotational speed N input from the electric motor 4 to the second high-pressure pump differential pressure calculation unit 10n.

The second high-pressure pump differential pressure calculation unit 10n calculates a differential pressure $\Delta HP''$ before and after the high-pressure pump on the basis of the fuel flow rate Q input from the rotational speed/flow rate conversion table 10m, and the differential pressure $\Delta P$ before and after the valve, low-pressure pump inlet pressure Pin, rotational speed N, combustor pressure Pb, and combustion nozzle differential pressure $\Delta Pn$ which are input separately. That is, the second high-pressure pump differential pressure calculation unit 10n calculates a boost amount of the low-pressure pump 2 (low-pressure pump boosting S) on the basis of the fuel flow rate Q and the rotational speed N and calculates the differential pressure $\Delta HP''$ before and after the high-pressure pump on the basis of the following Formula (4) based on the low-pressure pump boosting S, the differential pressure $\Delta P$ before and after the valve, the low-pressure pump inlet pressure Pin, the combustor pressure Pb, and the combustion nozzle differential pressure $\Delta Pn$. Such a second high-pressure pump differential pressure calculation unit 10n outputs the differential pressure $\Delta HP''$ before and after the high-pressure pump to the volume efficiency calculation unit 10i.

$$\Delta HP'' = \{Pb - \Delta Pn - \Delta P - (Pin + S)\} \quad (4)$$

That is, the flow rate calculation unit 10a' in the modified example individually acquires the differential pressure $\Delta HP'$ before and after the high-pressure pump necessary for the calculation of the internal leak area $A_{leak}$ and the differential pressure $\Delta HP''$ before and after the high-pressure pump necessary for the calculation of the volume efficiency $\eta y$ on the basis of the differential pressure $\Delta P$ before and after the valve and the rotational speed N as measured values. The pump differential pressure meter 6 can be eliminated and more accurate internal leak area $A_{leak}$ and volume efficiency $\eta y$ can be acquired by adopting such a flow rate calculation unit 10a'.

Figure 5:
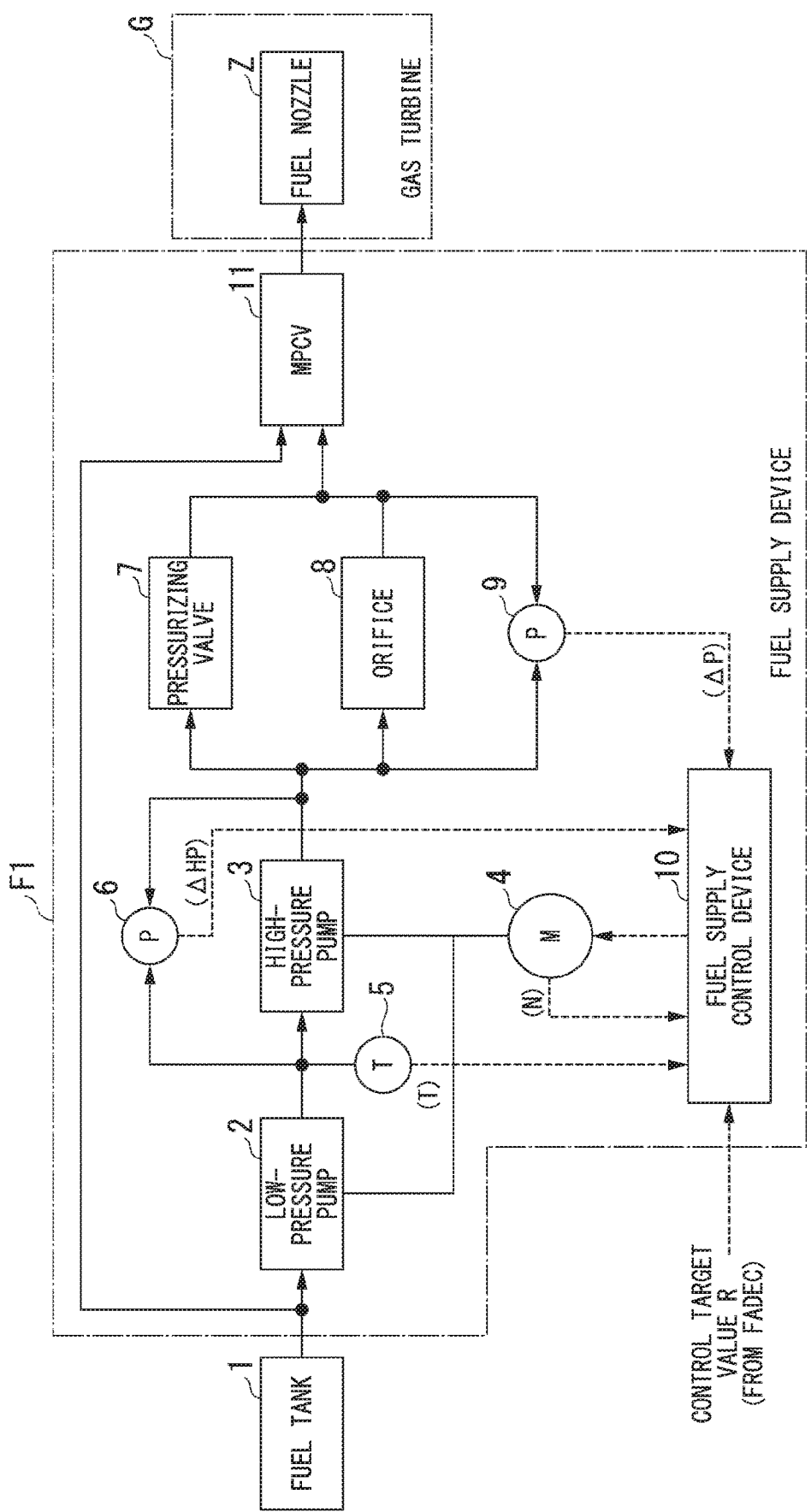
FIG. 5 is a block diagram showing a system constitution of a fuel supply device according to a modified example of an embodiment of the present disclosure.

(2) In the above-described embodiment, although the fuel is directly supplied to the gas turbine G from the complex pressurizing valve including the pressurizing valve 7 and the orifice 8 as shown in FIG. 1, the present disclosure is not limited thereto. For example, as shown in FIG. 5, a fuel supply device F1 which supplies fuel to the gas turbine G from the complex pressurizing valve via a lowest pressure pressurizing valve 11 may be adopted.

This lowest pressure pressurizing valve 11 adjusts an outlet pressure of the pressurizing valve in accordance with a fluctuation of the outlet pressure of the airframe fuel pump in the low flow rate region so that the outlet pressure of the airframe fuel pump is constant when seen from the high-pressure pump 3. Further, when such a lowest pressure pressurizing valve 11 is provided, it is not necessary to input the outlet pressure of the airframe fuel pump, but a correction calculation determined by a design of the lowest pressure pressurizing valve 11 needs to be performed in the first high-pressure pump differential pressure calculation unit 10k on the basis of the fuel flow rate Q (the first fuel measurement amount Q1).

(3) Since the characteristics of the high-pressure pump 3 change due to wear or the like, the characteristic (the volume efficiency $\eta v$) stored in advance in the fuel supply control device on the basis of a shipping test or the like changes with time. When considering such a change with time of the volume efficiency $\eta v$, it is conceivable to sequentially update a control table of the rotational speed/flow rate conversion table 10m. Alternatively, it is conceivable that a calculation unit similar to the volume efficiency calculation unit 10i be provided in place of the rotational speed/flow rate conversion table 10m and a previous value of a controller be used as the differential pressure $\Delta HP''$ before and after the high-pressure pump. In this case, the previous value is a value 1 ms before (in the past) when a control cycle of the controller is, for example, 1 ms. Furthermore, it is conceivable to retain a previous value of the fuel flow rate Q (the second fuel measurement amount Q2) and then to output it to the second high-pressure pump differential pressure calculation unit 10*n* without using the rotational speed/flow rate conversion table 10*m*.

(4) The rotational speed N of the high-pressure pump 3 (the fuel supply pump) may sometimes exceed a predetermined threshold value during the operation of the gas turbine G (the engine). When the first fuel measurement amount Q1 and the second fuel measurement amount Q2 are switched between each time, the fuel control may become unstable when the two amounts are switched between. When considering these possibilities, it is conceivable that, at the time of starting the gas turbine G (the engine), the first fuel measurement amount Q1 be used until the rotational speed N of the high-pressure pump 3 (the fuel supply pump) exceeds the predetermined threshold value, and after the rotational speed N of the high-pressure pump 3 exceeds the predetermined threshold value once, the second fuel measurement amount Q2 be used until the gas turbine G stops.

(5) Regarding the relationship between the rotational speed N of the high-pressure pump 3 (the fuel supply pump) and the fuel flow rate, when the high-pressure pump 3 is worn and deteriorated, the fuel flow rate decreases even with the same rotational speed N. Therefore, when the rotational speed N of the high-pressure pump 3 is compared with the predetermined threshold value, an operating state of the gas turbine G at the time of switching between the first fuel measurement amount Q1 and the second fuel measurement amount Q2 may not be constant. When stable control of the operating state of the gas turbine G is focused on, when the switching between the first fuel measurement amount Q1 and the second fuel measurement amount Q2 occurs only in a constant engine state, it is easier to prevent control of the operating state of the gas turbine G from becoming unstable.

That is, it is conceivable that a state amount of the gas turbine G (for example, the engine speed, the combustor pressure, and a combined value calculated from the measured values thereof) be used, the first fuel measurement amount Q1 is used until the rotational speed N of the high-pressure pump 3 exceeds the predetermined threshold value, and after the rotational speed of the high-pressure pump 3 exceeds the predetermined threshold value once, it is possible to use the second fuel measurement amount Q2 until the gas turbine G stops.

(6) In the above-described embodiment, although the fuel density ρ is calculated on the basis of the relational expression between the fuel density ρ and the fuel temperature T by adopting the fuel density calculation unit 10*g*, the present disclosure is not limited thereto. For example, it is also possible to acquire the mutual relationship between the fuel density ρ and the fuel temperature T in advance and to acquire the fuel density ρ using a control table (a temperature/density conversion table) which indicates such a mutual relationship.

INDUSTRIAL APPLICABILITY

According to the present disclosure, it is possible to improve measurement reproducibility of the fuel discharged from the fuel pump, as compared with the related art.

What is claimed is:

1. A fuel supply control device for being disposed in a fuel supply device including an orifice, a pressurizing valve, a differential pressure meter, and a fuel supply pump and for, by using a parallel flow path of the orifice and the pressurizing valve is used as a complex pressurizing valve for a fuel supply amount and, controlling the fuel supply pump is controlled on the basis of a differential pressure before and after the complex pressurizing valve detected by the differential pressure meter, the fuel supply control device comprising:

at least one memory storing instructions, and at least one processor configured to execute the instructions, wherein the at least one processor is configured to:

control the fuel supply pump the fuel supply pump is configured to be controlled on the basis of a first fuel measurement amount obtained from the differential pressure before and after the complex pressurizing valve and a mutual relationship between the differential pressure before and after the complex pressurizing valve and a fuel flow rate when a rotational speed of the fuel supply pump is below a predetermined threshold value, control the fuel supply pump on the basis of a second fuel measurement amount obtained from a pump volume efficiency in consideration of an internal leak area of the fuel supply pump and a theoretical pump discharge volume when the rotational speed exceeds the predetermined threshold value, calculate the first fuel measurement amount and the second fuel measurement amount, generate a switching signal by comparing the rotational speed of the fuel supply pump with the predetermined threshold value, selectively select the first fuel measurement amount or the second fuel measurement amount on the basis of the switching signal, calculate a deviation between the selected first or second fuel measurement amount and a control target value; and generate an operation amount of the fuel supply pump by performing a predetermined control calculation process on the deviation.

2. The fuel supply control device according to claim 1, wherein the at least one processor is further configured to acquire the internal leak area when the rotational speed of the fuel supply pump is below the predetermined threshold value.

3. The fuel supply control device according to claim 1, wherein the at least one processor is further configured to acquire the internal leak area on the basis of the first fuel measurement amount, the rotational speed, the theoretical pump discharge volume, a fuel temperature at an inflow port of the fuel supply pump, a differential pressure before and after the fuel supply pump, and a flow rate coefficient of the fuel supply pump.

4. The fuel supply control device according to claim 1, wherein the at least one processor is further configured to acquire the pump volume efficiency on the basis of the internal leak area, the rotational speed, the fuel temperature at the inflow port of the fuel supply pump, the differential pressure before and after the fuel supply pump, and the flow rate coefficient of the fuel supply pump.

* * * * *